Nov. 17, 1959  R. A. McDERBY  2,913,038
SEATS

Filed March 8, 1957  2 Sheets-Sheet 1

INVENTOR
Richard A. McDerby

BY
ATTORNEY

Nov. 17, 1959     R. A. McDERBY     2,913,038
SEATS

Filed March 8, 1957     2 Sheets-Sheet 2

INVENTOR
Richard A. McDerby

BY *[signature]*

ATTORNEY

United States Patent Office 2,913,038
Patented Nov. 17, 1959

2,913,038

SEATS

Richard A. McDerby, Denison, Tex.

Application March 8, 1957, Serial No. 644,780

3 Claims. (Cl. 155—54)

This invention relates to seats and more particularly to resiliently mounted seats for boats and the like.

An object of this invention is to provide a new and improved resiliently mounted seat for boats and the like.

Another object is to provide a seat resiliently supported by plywood springs.

Still another object is to provide a seat assembly wherein the plywood springs have a lower base section and an upper seat section to which the seat is secured, the base and seat sections being connected by a bend or bight section.

A further object is to provide a seat assembly of the type described, wherein the base section of each plywood spring is provided with a reinforcing insert disposed between the plies of the plywood.

A still further object is to provide a seat assembly of the type described, wherein the reinforcing insert has a tapered forward edge which permits the plies to converge together adjacent the lower end of the bight section whereby the several plies which form the spring and the reinforcing insert are firmly bound together into a single unit or structure.

Another object is to provide a seat assembly of the type described, wherein the reinforcing insert is provided with transverse apertures for receiving mounting means which secure the seat to a boat or the like.

Still another object is to provide a seat assembly of the type described, having stop means for limiting downward movement of the seat section toward the base section.

Another object is to provide a seat assembly of the type described, wherein the stop means include a resilient member mounted on the base section and engageable by the seat section.

A still further object is to provide a seat assembly of the type described, wherein the springs include substantially upright arm sections connected to the seat sections by rear bend bight portions and on which is secured a back rest.

Additional objects and advantages of the invention will be readily apparent from the reading of the following description of devices constructed in accordance with the invention, and reference to the accompanying drawings thereof, wherein.

Figure 1:
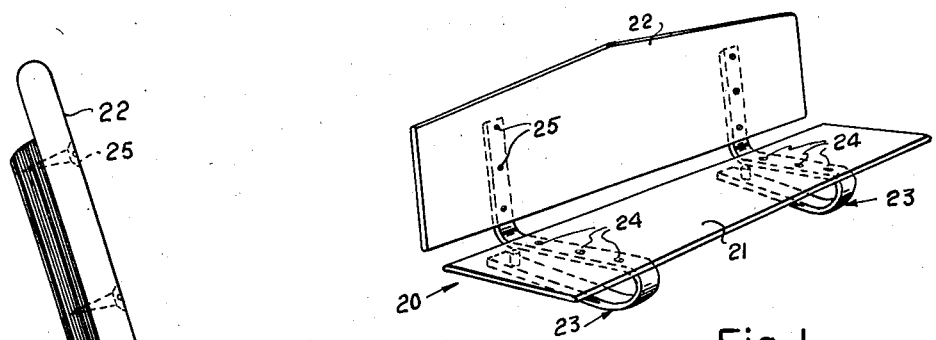
Figure 1 is a perspective view of a seat assembly embodying the invention.
Figure 2:
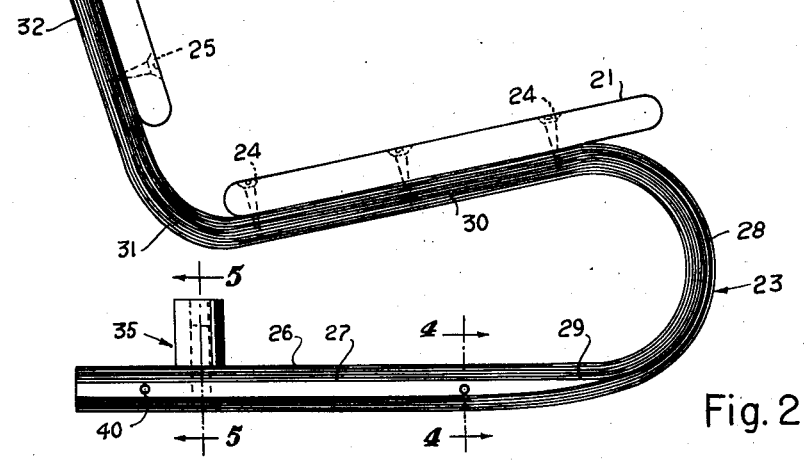
Figure 2 is an enlarged side elevation of the seat assembly shown in Figure 1.
Figure 3:
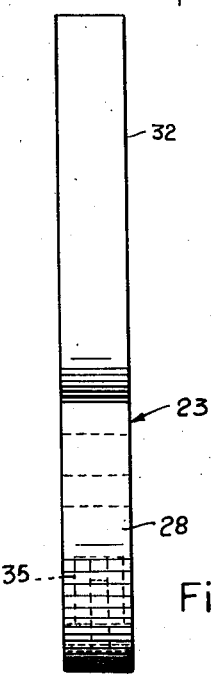
Figure 3 is a front view of one of the springs of the seat assembly shown in Figures 1 and 2.
Figures 4, 5:
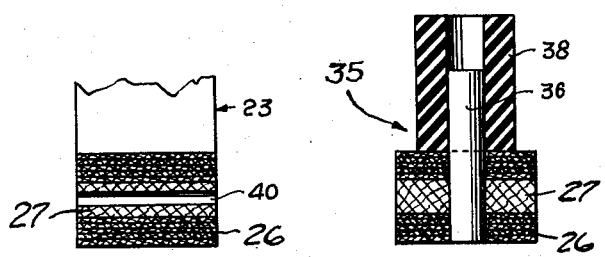
Figure 6:
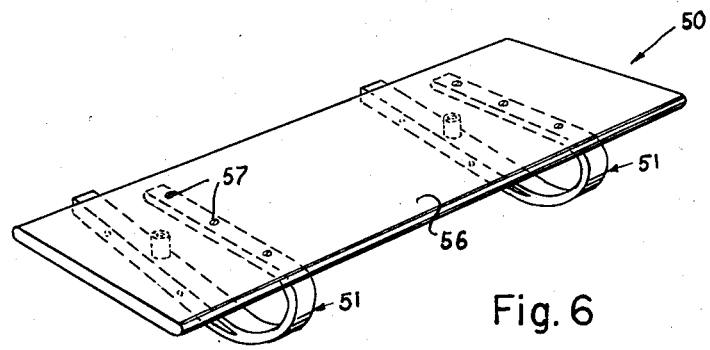
Figure 7:
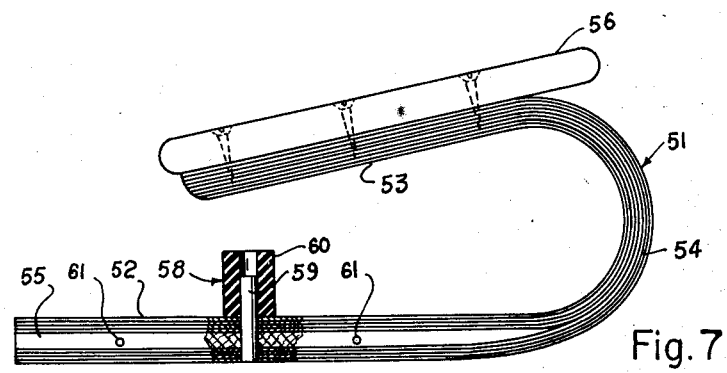
Figures 8, 9:
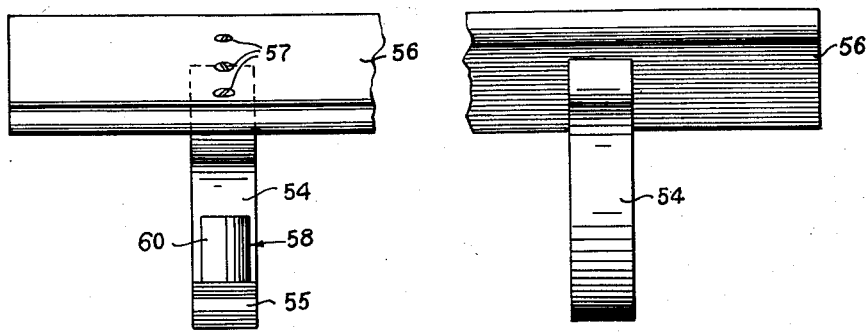

Figures 4 and 5 are fragmentary sectional views taken on the lines 4—4 and 5—5, respectively, of Figure 3;

Figure 6 is a perspective view of a modified form of the seat assembly shown in Figure 1;

Figure 7 is an enlarged side view of the seat assembly shown in Figure 6 with some parts being broken away to show the details of the stop structure;

Figure 8 is a fragmentary rear view of the seat assembly in Figure 6; and

Figure 9 is a fragmentary front view of the seat assembly shown in Figure 6.

Referring now particularly to Figures 1 through 5 of the drawings, the seat assembly or seat unit 20 includes a seat 21 and a back rest 22 mounted on a pair of resilient springs 23 by means of screws 24 and 25, respectively.

Each of the springs 23 is formed of plywood which is resilient and therefore provides the desired spring action, preferably twelve ply veneer plywood bonded with waterproof glue. Each of the springs 23 has a base section 26 which is rigidified and reinforced by an insert 27 of mahogany or other hardwood. The reinforcing insert 27 is disposed between the plies of wood veneer which form the plywood and extends from the rear of the base section 26 of the spring to a point adjacent the lower end of the forward bend or bight 28 of the spring, the front end of the reinforcing insert being tapered as at 29, to permit the plies on opposite sides of the insert to converge adjacent the lower end of the forward end or bight 28 and so that the several plies and the reinforcing insert are firmly held together in a unitary structure. A suitable waterproof or water-resistant adhesive or bonding means is used to secure or bond the insert and the plies to one another. The springs 23 also have seat sections 30 which overlie the base sections and extend downwardly and rearwardly from the upper end of the forward bight sections to the lower ends of rear bight sections 31. Substantially upright arm sections 32 extend upwardly from the upper end of the rear bight sections, and the back rest 22 is connected to these arms. It will be seen that the forward bight sections 28 connect the seat sections 30 to the base sections 26 and provide a resilient or spring actiion which permits the seat sections 30, and therefore the seat 21, to move toward and away from the base sections. Similarly, the rear bight sections 31 connect the arm sections 32 and the seat 30 and provides a resilient or spring action which permits the arm sections, and therefore the back rest 22, to move rearwardly away from and forwardly toward the seat 21.

A stop or bumper assembly 35 is mounted on each base section 26 beneath the overlying rear end of the seat section 30 or the forward lower end of the rear bight portion 31 so as to be engaged thereby to limit downward movement of the seat. Each stop assembly includes a dowel pin 36 which extends through registering apertures in the plywood and the reinforcing insert and is secured therein by a suitable adhesive or bonding agent. A portion of the dowel pin extends above the base section and is received in the lower end of a resilient sleeve 38 which telescopes thereover. The lower end of the resilient sleeve, which may be of rubber, rests on the upper surface of the base section. An upper portion of the resilient sleeve extends above the upper end of the dowel pin so that when the upper end of the resilient sleeve is engaged by the overlying portion of the spring as the seat is moved downwardly, the resilient sleeve will compress or deform to absorb or cushion any shock which may be imparted to the seat when its downward motion is arrested. Extreme downward movements of the seat are, of course, arrested by the upper ends of the dowel pins which are of rigid material such as wood.

The seat assembly is mounted or secured to the longitudinally extending stringers, not shown, of a boat by means of bolts, not shown, which extend through the transverse apertures 40 in the hardwood reinforcing insert 27. It will thus be seen that the reinforcing insert not only reinforces and rigidifies the base section of each spring but also provides a means for mounting the seat to the structure, such as a boat, on which it is used. The hardwood, of course, being a single ply, receives the bolt holes or apertures without splitting and resists wear and abrasion to a much better degree than plywood.

It will now be seen that a new and improved seat assembly for boats and the like has been illustrated and described which includes a plurality of resilient members or springs 23 having rigidified base sections 26 connected to seat sections 30 by forward bight sections 28 which permit resilient movement of the seat sections with regard to the base sections. It will also be seen that the base sections are provided with hardwood inserts having transverse apertures for receiving bolts or other mounting means.

It will also be apparent that the seat 21 is mounted on the seat sections 30 and that a stop or bumper assembly 35 is mounted on the base sections 26 of the spring to be engaged by overlying portions of the springs to limit downward movement of the seat and to absorb or cushion the shock attendant to the arresting of downward movement of the seat.

It will also be apparent that the springs are provided with substantially upright arms 32 which are resiliently connected to the seat sections by rear bights 31 and which support a back rest 22.

It will also now be seen that the seat assembly described and illustrated is of simple construction which can be easily assembled and mounted on a boat or the like and provides a comfortable yielding seat which tends to absorbs vibrations and thus reduces discomfort to the occupant of the seat.

In Figures 6 through 9 is illustrated a seat assembly 50 which includes a plurality of springs 51 having only a base section 52 and a seat section 53 connected by a forward bend or bight section 54. The base sections of the springs are provided with hardwood inserts 55 and a seat 56 is connected to the seat sections by screws 57. A stop or bumper assembly 58 is mounted on each of the base sections and includes a dowel pin 59 and a resilient means or sleeve 60 having a lower portion telescoped over the upwardly projecting upper end portion of the dowel pin. The upper portion of the resilient sleeve is engageable by an overlying portion of the spring when the seat is moved downwardly toward the base section.

The insert 55 is provided with a pair of transverse apertures 61 to receive bolts or other fastening means by means of which the seat assembly 50 may be secured in a boat or the like.

It will now be seen that the seat assembly 50 of Figure 6 differs from that seat assembly 20 of Figure 1, principally in the lack of a back rest and the means for securing it in a substantially vertical position relative to the seat. Otherwise, the structure and operation of this seat is the same as that first described.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. A seat assembly comprising: a pair of resilient mounting means laterally spaced from each other and each having a base section, a seat section overlying the base section, and a forward bight section curving upwardly and forwardly from the forward end of the base section and then upwardly and rearwardly to the forward end of the seat section, said sections being integral with one another, said seat section being resiliently movable toward and away from the base section, the forward bight portion flexing to permit such movement of the seat section; a seat secured on said seat sections of said pair of resilient mounting means; said resilient means each having a plurality of longitudinally extending plies of wood bonded to one another, said base section including a reinforcing strip disposed substantially centrally between the plies and extending completely transversely of said plies and longitudinally thereof from the rear end of said base section to a point adjacent the commencement of the upward and forward curving of the bight section; and a stop means on each resilient mounting means, said stop means each including: a rigid pin member secured in the base section and projecting upwardly therefrom, and a resilient sleeve having a lower portion telescoped over and frictionally engaging the upwardly projecting portion of the pin and also having an upper portion projecting upwardly above the upper end of said pin and disposed to engage said seat portion of said resilient member to act as a bumper for absorbing the shock of stopping the downward movement of said seat section.

2. A seat assembly comprising: a resilient mounting means having a base section, a seat section overlying the base section, and a forward bight section curving forwardly and upwardly from the forward end of the base section and then rearwardly and upwardly to the forward end of the seat section, said sections being integral with one another; and a seat secured on said seat section, said resilient mounting means having a plurality of longitudinally extending plies of wood bonded to one another, said base section including a reinforcing strip disposed between the plies and extending completely transversely of said plies and longitudinally thereof from the rear end of said base section to a point adjacent the commencement of the upward and forward curving of said bight section, said reinforcing strip having a forward tapered portion having a lower side sloping forwardly upwardly toward the point adjacent the commencement of the upward and forward curving of said bight section, said reinforcing strip being of wear resistant wood and having a transverse aperture completely transversely therethrough and spaced from the plies of wood above and below said reinforcing strip for receiving a mounting means whereby a seat assembly may be secured to a fixed structure.

3. A seat assembly comprising: a resilient mounting means having a base section, a seat section overlying the base section, and a forward bight section curving forwardly and upwardly from the forward end of the base section and then rearwardly and upwardly to the forward end of the seat section, said sections being integral with one another; and a seat secured on said seat section, said resilient mounting means having a plurality of longitudinally extending plies of wood bonded to one another, said base section including a reinforcing strip disposed between the plies and extending completely transversely of said plies and longitudinally thereof from the rear end of said base section to a point adjacent the commencement of the upward and forward curving of said bight section, said reinforcing strip being of wear resistant wood and having a transverse aperture completely transversely therethrough and spaced from the plies of wood above and below said reinforcing strip for receiving a mounting means whereby a seat assembly may be secured to a fixed structure.

References Cited in the file of this patent

UNITED STATES PATENTS

| 1,791,453 | Mies | Feb. 3, 1931 |
| 2,046,858 | Walenta | July 7, 1936 |
| 2,691,406 | Hickman | Oct. 12, 1954 |
| 2,787,315 | Siebert | Apr. 2, 1957 |

FOREIGN PATENTS

| 431,563 | Great Britain | July 8, 1935 |
| 848,404 | Germany | Sept. 4, 1952 |